(12) United States Patent
Liu et al.

(10) Patent No.: US 8,554,220 B2
(45) Date of Patent: Oct. 8, 2013

(54) MOBILE TERMINAL AND NETWORK DEVICE FOR PROVIDING HANDOVER SERVICE

(75) Inventors: Xiaoyu Liu, Yongin-si (KR); Su Won Lee, Seongnam-si (KR); Marius-Iulian Corici, Berlin (DE); Alin Florindor Murarasu, Berlin (DE); Stefan Arbanowski, Berlin (DE)

(73) Assignees: Samsung Electronics Co., Ltd., Suwon-si (KR); Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 1068 days.

(21) Appl. No.: 12/190,390

(22) Filed: Aug. 12, 2008

(65) Prior Publication Data
US 2009/0270102 A1    Oct. 29, 2009

(30) Foreign Application Priority Data
Apr. 23, 2008  (KR) .................. 10-2008-0037711

(51) Int. Cl.
*H04W 4/00* (2009.01)
*G06F 15/173* (2006.01)

(52) U.S. Cl.
USPC ...................... 455/436; 370/331; 709/224

(58) Field of Classification Search
USPC ............... 709/224; 455/436; 370/331
See application file for complete search history.

(56) References Cited

U.S. PATENT DOCUMENTS 7,656,835 B2 * 2/2010 Joutsenvirta et al. ......... 370/328

| | | | |
|---|---|---|---|
| 2006/0140150 A1 | 6/2006 | Olvera-Hernandez et al. | |
| 2006/0187858 A1 | 8/2006 | Kenichi et al. | |
| 2006/0276192 A1 | 12/2006 | Dutta et al. | |
| 2006/0277298 A1 * | 12/2006 | Kim et al. | 709/224 |
| 2007/0110075 A1 | 5/2007 | Olvera-Hernandez | |
| 2007/0140256 A1 * | 6/2007 | Yaqub | 370/395.5 |
| 2007/0280453 A1 * | 12/2007 | Kelley et al. | 379/201.01 |
| 2008/0130647 A1 * | 6/2008 | Ohba et al. | 370/392 |
| 2008/0288654 A1 * | 11/2008 | Matuszewski et al. | 709/238 |

FOREIGN PATENT DOCUMENTS

KR  10-2006-0109300    10/2006
KR  10-2007-0079289     8/2007

OTHER PUBLICATIONS

IEEE Transaction on mobile computing, vol. 5 No. 10, Oct. 2006—A cross-layer (Layer 2 + 3) handoff management protocol for next-generation wireless system—Reference Document No. 01683785.*
IEEE Doc. 2004—Optimizing SIP Application Mobility over IPv6 using Layer 2 Triggers Reference Doc No. IEEE SIP Application layer.*
Improving Layer 3 Handoff Delay in IEEE 802.11 Wireless Networks Reference Doc. No. l3handoff.*
Henning Schulzrinne—Mobile Computing and Communications Review, vol. 1, No. 2—Application Layer Mobility Using SIP.*

* cited by examiner

*Primary Examiner* — Nizar Sivji
(74) *Attorney, Agent, or Firm* — NSIP Law

(57) ABSTRACT

A mobile terminal and a network device for providing a handover service are provided. A mobile terminal includes a transmission unit to transmit a request message for handover information to a network device, and a receiving unit to receive a response message including the handover information from the network device, wherein the request message and the response message are transceived by an application layer protocol.

17 Claims, 6 Drawing Sheets

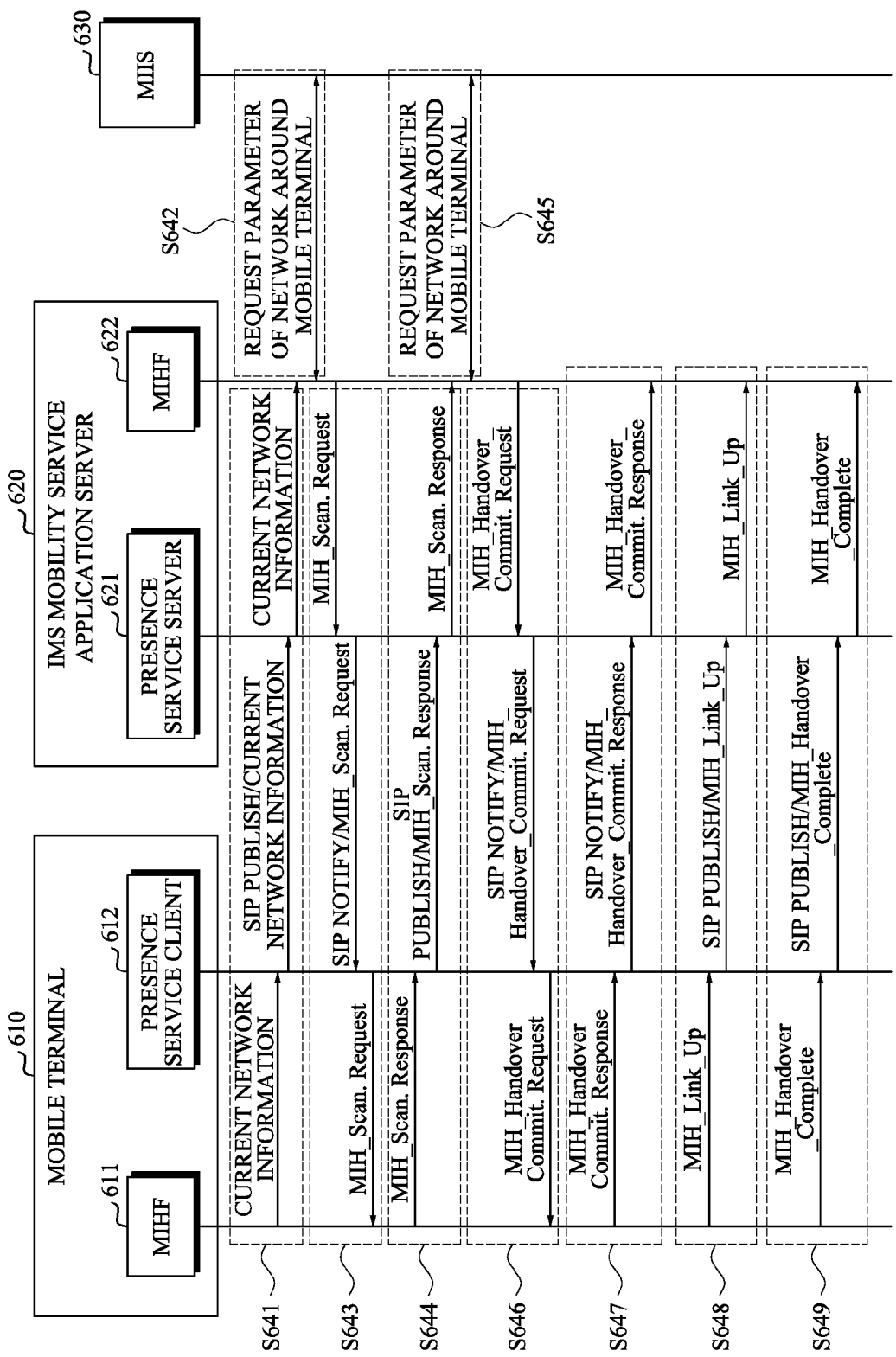

MOBILE TERMINAL AND NETWORK DEVICE FOR PROVIDING HANDOVER SERVICE

CROSS-REFERENCE TO RELATED APPLICATION

This application claims the benefit under 35 U.S.C. §119(a) of a Korean Patent Application No. 10-2008-0037711, filed on Apr. 23, 2008, in the Korean Intellectual Property Office, the entire disclosure of which is incorporated herein by reference.

TECHNICAL FIELD

The following description relates to a mobile terminal and a network device for providing a handover service, and more particularly, to a mobile terminal and a network device for transceiving a message related to handover service using an application layer protocol.

BACKGROUND

Where a mobile terminal in a call state moves from a service area (a cell boundary) of a corresponding base station to a service area of another adjacent base station, a handover management issue of changing a communication path to the adjacent base station, to which the mobile terminal moves in order to maintain a call, occurs. Accordingly, a mechanism to exchange handover information between a mobile terminal and a network may be needed for a seamless call in a mobile environment.

Typically, to exchange handover information, a protocol of a lower layer such as a Media Access Control (MAC) protocol of a data link layer is used.

However, where the protocol of the lower layer is used, a data transmission-related mechanism of the lower layer related to a handover in several networks may need to be modified for each network. For example, where the handover information is exchanged using a protocol of a data link layer, MAC may need to be modified.

Where an event, a command, and an information mechanism of the handover such as a Media Independent Handover (MIH) were intended to be used, a detailed mechanism with respect to a message exchange in an application layer could not be conventionally provided. This reduces the applicability of communication between interior multi-layers in a mobile terminal or between mobile terminals in the same network.

Accordingly, there is needed a mobile terminal and a network device for transceiving handover information where a need for modifying a data transmission mechanism of a lower layer is removed.

SUMMARY

According to an aspect, there is provided a mobile terminal and a network device for transceiving a message that includes handover information without modifying a data transmission mechanism of a lower layer.

According to another aspect, there is provided a mobile terminal and a network device for transceiving a message that includes handover information using a legacy protocol.

According to still another aspect, there is provided a mobile terminal comprising a transmission unit to transmit a request message for handover information to a network device, and a receiving unit to receive a response message including the handover information from the network device, wherein the request message and the response message are transceived by an application layer protocol.

The transmission unit may repeatedly transmit the request message, and the receiving unit may receive the response message corresponding to each of the transmitted request messages.

The request message may include an expiration time value with respect to a time of receiving the response message, and the expiration time value may correspond to 0.

The transmission unit may transmit the request message once, and the receiving unit may repeatedly receive at least one response message corresponding to the transmitted request message.

The transmission unit may transmit, to the network device, a stop message to stop receiving the response message.

The mobile terminal may further comprise an interface unit to connect the receiving unit and the transmission unit with a device to perform a handover function.

A handover may correspond to a Media Independent Handover (MIH).

The application layer protocol may correspond to a mobility support protocol.

The application layer protocol may correspond to a Session Initiation Protocol (SIP).

The SIP may provide an SIP event service, and the transmission unit may transmit the request message using an SIP SUBSCRIBE request.

The SIP may provide an SIP presence service, and the transmission unit may transmit the request message using an SIP PUBLISH request.

The receiving unit may receive the response message using an SIP NOTIFY request.

The application layer protocol may correspond to an SIP, the SIP may provide an SIP presence service, and the transmission unit may transmit the stop message using an SIP SUBSCRIBE request.

The handover information may include at least one of events, commands, and information, which are related to handover defined in an Institute of Electrical and Electronics Engineers (IEEE) 802.21.

According to yet another aspect, there is provided a network device comprising a receiving unit to receive a request message for handover information from at least one mobile terminal, and a transmission unit to transmit a response message including the handover information to the at least one mobile terminal, wherein the request message and the response message are transceived by an application layer protocol.

The receiving unit may repeatedly receive the request message, and the transmission unit may transmit the response message corresponding to each of the received request messages.

The receiving unit may receive the request message once, and the transmission unit may repeatedly transmit at least one response message corresponding to the received request message.

Where the transmission unit receives a stop message to stop transmission of the response message, the transmission unit may stop the transmission of the response message to the at least one mobile terminal.

The network device may further comprise an interface unit to connect the receiving unit and the transmission unit with a device to perform a handover function.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 6 is a diagram illustrating a flow of handover information based on an SIP presence service between a mobile terminal and an IMS mobility service application server according to an exemplary embodiment.

Throughout the drawings and the detailed description, unless otherwise disclosed, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
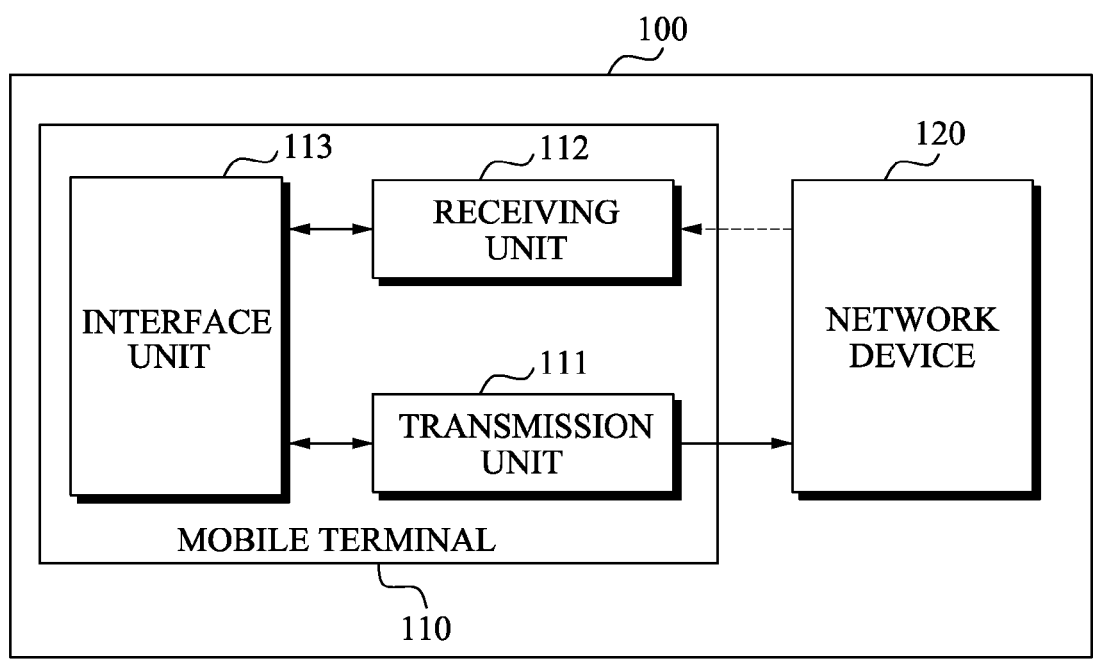
FIG. 1 is a block diagram illustrating a configuration of a communication system including a mobile terminal for transceiving a message including handover information according to an exemplary embodiment.

FIG. 1 illustrates a communication system 100 including a mobile terminal for transceiving a message including handover information according to an exemplary embodiment. The communication system 100 comprises a mobile terminal 110 and a network device 120.

The mobile terminal 110 comprises a transmission unit 111, a receiving unit 112, and an interface unit 113.

The transmission unit 111 transmits a request message for handover information to the network device 120. The receiving unit 112 receives, from the network device 120, a response message including the handover information requested by the transmission unit 111. The handover information denotes information transceived between the mobile terminal 110 and the network device 120 in order to perform a handover.

The handover information according to an exemplary embodiment may include events, commands, and information, which are related to the handover defined in, for example, Institute of Electrical and Electronics Engineers (IEEE) 802.21. The events, commands, and information may comprise at least one of a network type, an operator name, and a roaming agreement. The operator name denotes a name of an operator related to performing the handover. The roaming agreement denotes an agreement for connection to enable communication in a service area of different communication providers.

The interface unit 113 connects the transmission unit 111 and the receiving unit 112 with a device to perform a handover function.

For example, the interface unit 113 may convert the response message into information used by the device to perform the handover function, and may transmit the converted response message to the device.

The request message and the response message are transceived by an application layer protocol. Where a protocol of a lower layer such as a Media Access Control (MAC) protocol of a data link layer is used for transceiving the request message and the response message, a data transmission-related mechanism of the lower layer in several networks related to the handover may need to be modified for each network. This may cause several problems including the cost rise and the like. Accordingly, where a message including the handover information is transceived using the application layer protocol, the message may be transmitted without a need for modifying the data transmission mechanism of the lower layer in each network.

According to an exemplary embodiment, the handover may be a horizontal handover or a vertical handover. The handover information according to an exemplary embodiment may be information about the horizontal handover (or a homogeneous handover) applied where a terminal moves between mobile communication cells in a homogeneous network to which the same technology is applied, or may be information about the vertical handover (or a heterogeneous handover) maintaining communication where the terminal, which enables multiple interface technology between heterogeneous networks to which different technologies are applied, moves. An example of the vertical handover may include a handover occurring between a wireless broadband Internet (WiBro) and a wireless local area network (WLAN) and between the WLAN and a code division multiple access (CDMA) network. Accordingly, the mobile terminal 110 may include an interface using an access technology for accessing at least one different network.

A handover according to an exemplary embodiment may be a Media Independent Handover (MIH). As an example of the MIH, a seamless handover may be used between heterogeneous networks defined in IEEE 802.21, so as to provide service continuity and convenience to a user of the mobile terminal. The MIH may include an event service, a command service, an information service, and the like to enable the mobile terminal having a multiple wireless interface to select a best network access type that may be automatically used without a user intervention, and to perform seamless handoff of a session between the heterogeneous networks or media. An upper MIH layer may be provided with appropriate network information using the MIH and perform the optimized handover. A handover function may be a Media Independent Handover Function (MIHF), and the handover information may be MIH primitives. Items defined in IEEE 802.21 may be applied to the MIH primitives.

Further exemplary embodiments of the mobile terminal 110 for transceiving handover information are described below.

According to an exemplary embodiment, with reference to FIG. 1, where a handover event occurs, the transmission unit 111 may transmit a request message to the network device 120. Where the mobile terminal 110 determines that handover information is needed, the transmission unit 111 may repeatedly transmit the request message to the network device 120.

The receiving unit 112 may receive a response message corresponding to each of the repeatedly-transmitted request message.

The request message may include an expiration time value with respect to a time of receiving the response message, and the expiration time value may correspond to 0. Where the transmission unit 111 transmits the request message including the expiration time value, the network device 120 transmits the response message to the mobile terminal 110 within a time defined in the expiration time value, and the receiving unit 112 receives the response message. Where the expiration time value corresponds to 0, the network device 120 transmits the response message to the mobile terminal 110 immediately after the network device 120 has received the request message, and the receiving unit 112 receives the response message.

As another example of the mobile terminal 110 for transceiving the handover information, the transmission unit 111 may transmit a request message once, and the receiving unit 112 may repeatedly receive at least one response message corresponding to the request message.

Where the handover information is needed, the transmission unit 111 may transmit the request message to the network device 120 initially only once, and the receiving unit 112 may receive at least one transmitted response message where the network device 120 determines that reporting the handover information to the mobile terminal 110 is needed, and transmits the response message. Transmission of the request message by the transmission unit 111 and receiving of the response message by the receiving unit 112 may be asynchronously performed. Where the transmission unit 111 transmits the request message, the response message may be received, or may not be received. The network device 120 determines whether the response message is transmitted.

Where the mobile terminal 110 does not need more handover information, the transmission unit 111 may transmit, to the network device 120, a stop message to stop the transmission of the response message. Where the network device 120 receives the stop message, the network device 120 stops transmitting the response message, and the receiving unit 112 no longer receives the response message.

The application layer protocol according to an exemplary embodiment may use a legacy protocol as is. When intending to generate a new protocol, several problems may occur, for example, security and reliability may need to be considered, an access server and a router may need to be upgraded, and the like. Accordingly, an exemplary embodiment may reduce attempts and costs required for generating the new protocol, and may easily transceive the handover information by using the legacy application layer protocol for transceiving the handover information.

The application layer protocol according to an exemplary embodiment may correspond to a mobility support protocol. The user may change a service point in an Internet Protocol (IP)-based wireless mobile network while communicating with other users. Since a new IP address needs to be allocated in a new location, communication may be disconnected. Accordingly, the application layer protocol for transceiving the handover information may correspond to the mobility support protocol enabling a location of the user to be maintained and enabling data to be continuously transmitted.

The application layer protocol according to an exemplary embodiment may correspond to a Session Initiation Protocol (SIP). The SIP includes a request/response structure as a signaling protocol of an application layer to state a process during which intelligent terminals desiring to communicate on the Internet identify with each other, find locations of the intelligent terminals, and generate, modify, and delete a multimedia communication session with each other. The SIP may be used for both a Transmission Control Protocol (TCP) and a User Datagram Protocol (UDP), and a service may be provided without being dependent on an IP address using an SIP Uniform Resource Locator (URL) similar to an email address in order to classify each user. The SIP may be embodied based on a text developed using many portions of a Hypertext Transfer Protocol (HTTP) and a Simple Mail Transfer Protocol (SMTP) as is. As an example of the service provided by the SIP, an SIP event service and an SIP presence service may be included.

The mobile terminal 110 according to an exemplary embodiment may include an SIP client or an IP Multimedia Subsystem (IMS) client, and the network device 120 may include an SIP proxy. The SIP proxy maintains registration information related to the SIP client, and processes the message based on an SIP event/presence service standard. The SIP proxy may correspond to an IMS application server standard.

According to certain embodiments disclosed above, a new protocol may be generated by transceiving handover information using a legacy application layer protocol. Thus, handover information may be effectively transceived by eliminating a need for modifying a data transmission mechanism of a lower layer in each network.

Figure 2:
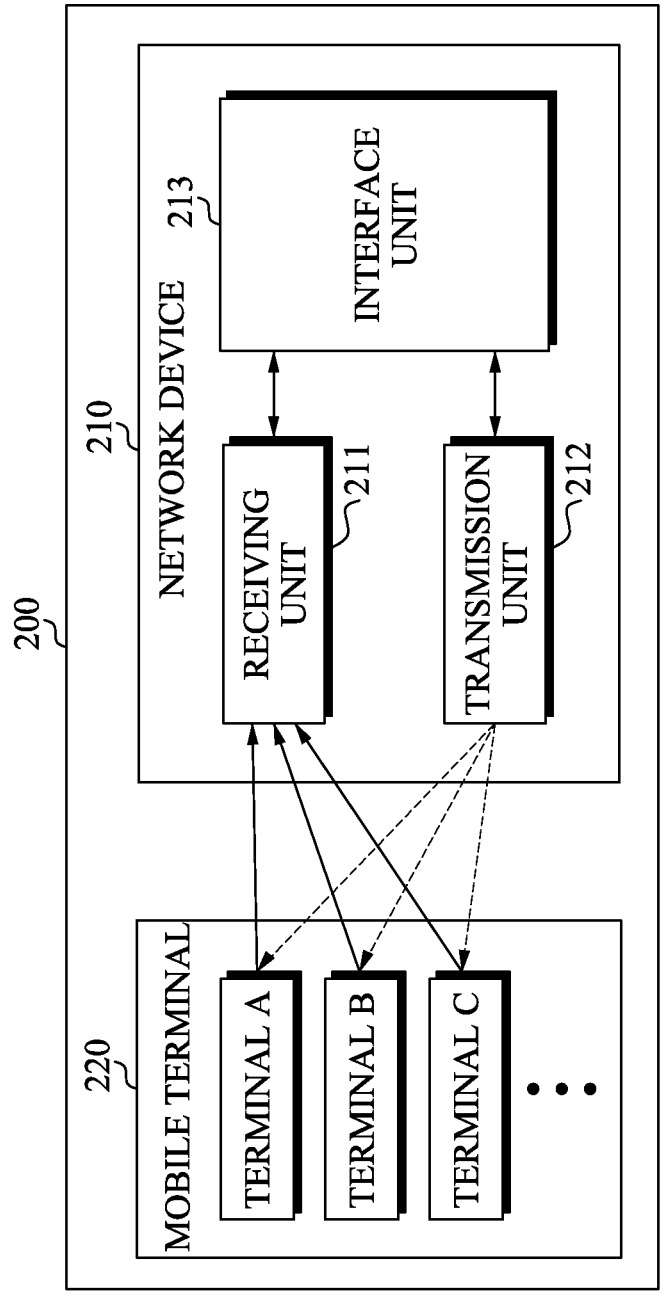
FIG. 2 is a block diagram illustrating a configuration of a communication system including a network device for transceiving a message including handover information according to an exemplary embodiment.

FIG. 2 illustrates a communication system 200 comprising a network device 210 for transceiving a message including handover information, according to an exemplary embodiment. The communication system 200 comprises the network device 210 and a mobile terminal(s) 220.

The network device 210 comprises a receiving unit 211, a transmission unit 212, and an interface unit 213.

The receiving unit 211 receives a request message for handover information from at least one of a plurality of mobile terminals 220. The receiving unit 211 according to an exemplary embodiment may receive the handover information including state information about a network around the mobile terminal 220.

The transmission unit 212 transmits a response message including the handover information to the mobile terminal 220 having transmitted the request message. Where the receiving unit 211 receives the request message, the transmission unit 212 transmits the response message to the mobile terminal 220 having transmitted the request message.

The interface unit 213 connects the receiving unit 211 and the transmission unit 212 with a device to perform a handover function.

As an example, the interface unit 213 converts the request message into information used by the device to perform the handover function and transmits the converted request message to the device.

Further exemplary embodiments of the network device 210 for transceiving handover information are described below.

According to an exemplary embodiment, where a handover event occurs in the at least one of the plurality of mobile terminals 220, the receiving unit 211 may receive a request message from the at least one of the plurality of mobile terminals 220. Where the at least one of the plurality of mobile terminals 220 determines that handover information is needed, the request message may be repeatedly received from the terminal. The transmission unit 212 may repeatedly transmit a response message corresponding to each of the received request message.

As another example of the network device 210 for transceiving the handover information, the receiving unit 211 may receive a request message from at least one of the plurality of mobile terminals 220 once, and the transmission unit 212 may repeatedly transmit at least one response message corresponding to the request message to the terminal having transmitted the request message.

The receiving unit 211 may receive the initial one-time request message from the at least one of the plurality of mobile terminals 220, and the transmission unit 212 may subsequently transmit the at least one response message to the terminal where the network device 210 determines that reporting the handover information to the terminal having transmitted the request message is needed.

Receiving a request message in the receiving unit 211 and transmitting a response message by the transmission unit 212 may be asynchronously performed. Where the receiving unit 211 receives the request message, the transmission unit 212 may or may not transmit the response message to the mobile terminal 220. The network device 210 determines whether the response message is transmitted.

Where the mobile terminal 220 does not need more handover information, the receiving unit 211 may receive a stop message from the mobile terminal 220 to stop the transmission of the response message. Where the receiving unit 211 receives the stop message, the transmission unit 212 stops the transmission of the response message.

Figure 3:
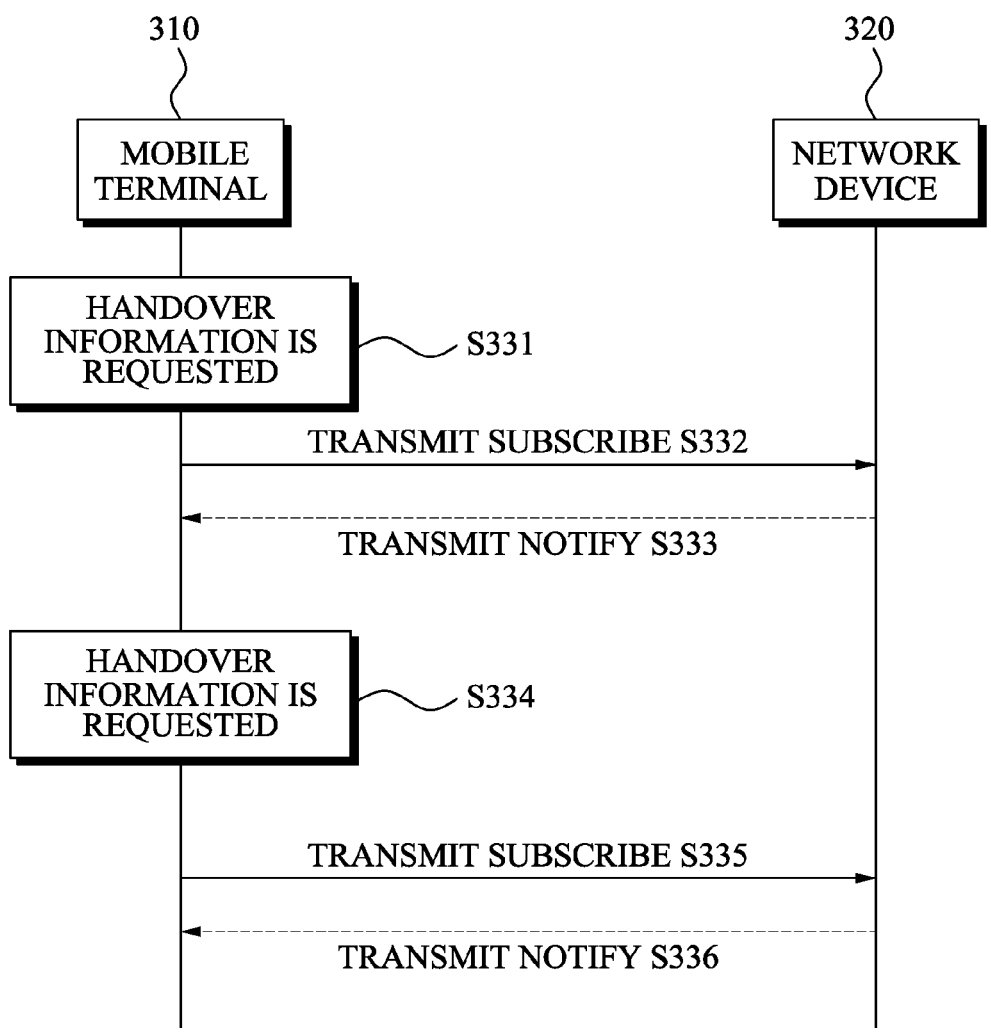
FIG. 3 is a diagram illustrating a process of transceiving a message including handover information between a mobile terminal and a network device using a Session Initiation Protocol (SIP) event service according to an exemplary embodiment.

FIG. 3 illustrates a process of transceiving a message including handover information between a mobile terminal 310 and a network device 320 using an SIP event service according to an exemplary embodiment.

Where the mobile terminal 310 needs the handover information in operation S331, the mobile terminal 310 transmits a handover information request message to the network device 320 in operation S332. For example, the mobile terminal 310 may transmit an SIP SUBSCRIBE request as the request message. The SIP SUBSCRIBE request may confirm that the request message is successfully received by a "200 OK" response.

In operation S333, the network device 320 transmits a response message including the handover information requested in the request message to the mobile terminal 310 after having received the request message. For example, the network device 320 may transmit an SIP NOTIFY request as the response message. Whether the SIP NOTIFY request is received may be verified by a "200 OK" response.

Where the SIP SUBSCRIBE request includes an expiration time value and the expiration time value corresponds to 0, the network device 320 transmits the SIP NOTIFY request to the mobile terminal 310 immediately after having received the SIP NOTIFY request from the mobile terminal 310.

Where the mobile terminal 310 needs handover information again in operation S334, transceiving of a request message and a response message is repeated in operations S335 and S336.

Figure 4:
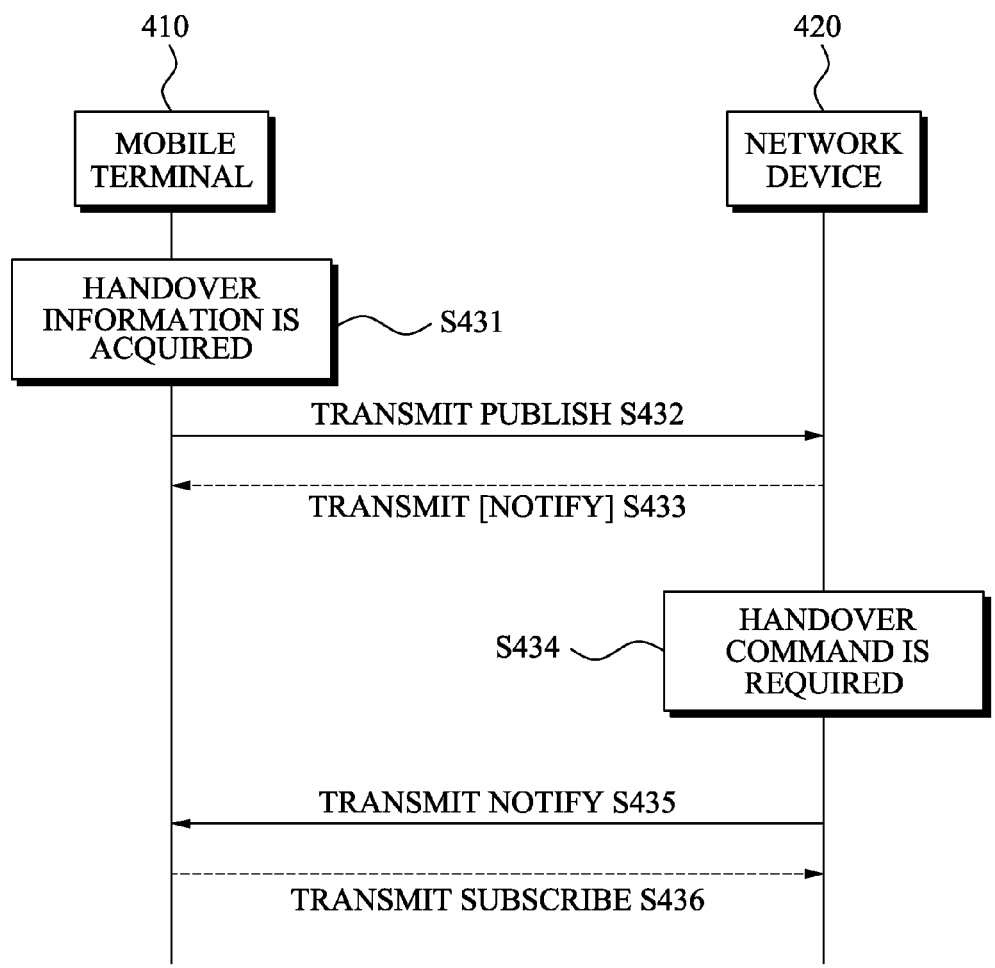
FIG. 4 is a diagram illustrating a process of transceiving a message including handover information between a mobile terminal and a network device using an SIP presence service according to an exemplary embodiment.

According to an exemplary embodiment described above, handover information may be transceived using an SIP event service provided by an SIP, which is a legacy application layer protocol. FIG. 4 illustrates a process of transceiving a message including handover information between a mobile terminal 410 and a network device 420 using an SIP presence service according to an exemplary embodiment.

The mobile terminal 410 transmits a handover information request message to the network device 420 in operation S432. For example, the mobile terminal 410 may transmit an SIP PUBLISH request as the request message. The SIP PUBLISH request may be verified by a "200 OK" response.

Where the mobile terminal 410 according to an exemplary embodiment has acquired the handover information in operation S431, the mobile terminal 410 transmits the SIP PUB-LISH request including the acquired handover information to the network device 420 in operation S432.

In operation S433, the network device 420 transmits a response message including the handover information requested in the request message to the mobile terminal 410 after having received the request message. For example, the network device 420 may transmit an SIP NOTIFY request as the response message. A response to the SIP PUBLISH request may or may not be performed by the SIP NOTIFY request. Whether the SIP NOTIFY request is transmitted is determined by the network device 420, different from the SIP event service of FIG. 3. The "[ ]" mark denotes that the SIP NOTIFY request may or may not be transmitted from the network device 420.

Where the network device 420 determines that a handover command is required in operation S434, the network device 420 transmits a response message including the handover information to the mobile terminal 410 in operation S435. For example, the network device 420 may transmit an SIP NOTIFY request as the response message. The SIP NOTIFY request is transmitted regardless of a time of receiving an SIP PUBLISH request. The SIP PUBLISH request and the SIP NOTIFY request may be asynchronously transceived. For example, where it is determined that handover information transmission to the mobile terminal 410 having transmitted the SIP PUBLISH request is needed, the network device 420 may repeatedly transmit the SIP NOTIFY request.

Where receiving of the handover information is unnecessary for the mobile terminal 410, the mobile terminal 410 transmits, to the network device 420, a stop message to stop the transmission of the response message in operation S436. For example, the stop message may correspond to an SIP SUBSCRIBE request. Transmission of the response message being repeatedly transmitted by the network device 420 may be stopped after a time of receiving the stop message.

According to an exemplary embodiment described above, handover information may be transceived using an SIP presence service provided by an SIP, the SIP being a legacy application layer protocol.

Figure 5:
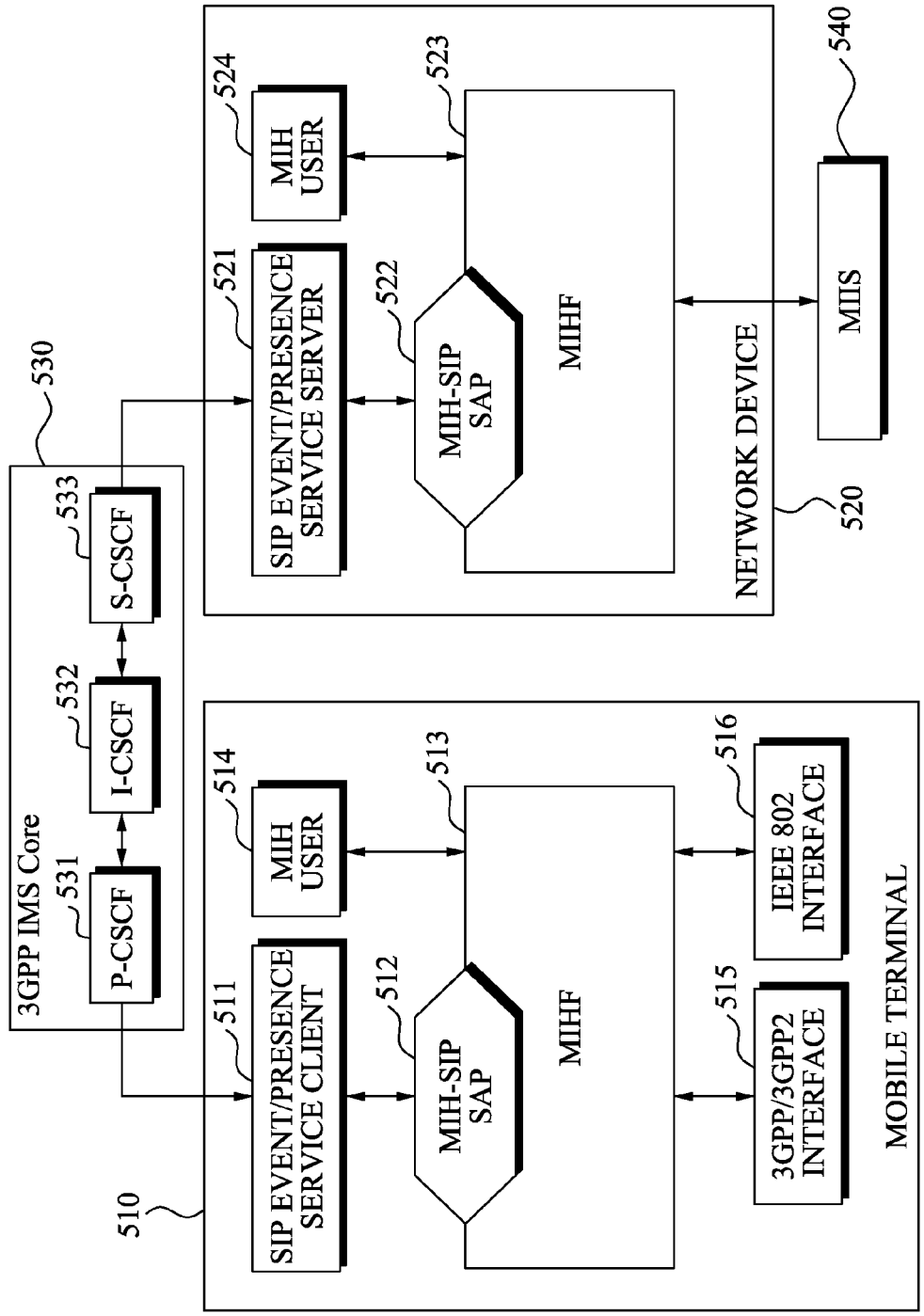
FIG. 5 is a block diagram illustrating a configuration of a communication system for transceiving handover information using an SIP in an Internet Protocol (IP) Multimedia Subsystem (IMS) basis according to an exemplary embodiment.

FIG. 5 illustrates a communication system for transceiving handover information using an SIP protocol in an IMS basis according to an exemplary embodiment.

The communication system may comprise a mobile terminal 510, a network device 520, a 3rd Generation Partnership Project (3GPP) IMS core 530, and a Media Independent Information Server (MIIS) 540.

The mobile terminal 510 may comprise an SIP event/presence service client 511, a Media Independent Handover-Session Initiation Protocol Service Access Point (MIH-SIP SAP) 512, an MIH Function (MIHF) 513, an MIH user 514, a 3GPP/3GPP2 interface 515, and an IEEE 802 interface 516, and the network device 520 may comprise an SIP event/presence service server 521, an MIH-SIP SAP 522, an MIHF 523, and an MIH user 524.

The SIP event/presence service client 511 and the SIP event/presence service server 521 transceive a request message, a response message, and a stop message in the mobile terminal 510 and the network device 520. The transmission unit 111 and the receiving unit 112 of FIG. 1 may correspond to the SIP event/presence service client 511, and the receiving unit 211 and the transmission unit 212 of FIG. 2 may correspond to the SIP event/presence service server 521.

The network device 520 may correspond to an IMS mobility application server. The IMS mobility application server may perform a function of an IMS presence server, and may manage an IMS registration state.

The MIH-SIP SAPs 512 and 522 denote a connection point between the SIP event/presence service client 511 and the MIHF 513, and a connection point between the SIP event/presence service server 521 and the MIHF 523. The interface unit 113 of FIG. 1 and the interface unit 213 of FIG. 2 may respectively correspond to the MIH-SIP SAPs 512 and 522.

The MIHFs 513 and 523 are defined in IEEE 802.21, and provide an event service, a command service, and an information service. The MIHF 523 may be connected with the MIIS 540, and may select a set of networks around the mobile terminal 510.

The MIH users 514 and 524 exist in an upper layer of the MIHFs 513 and 523, and perform the event service, the command service, and the information service.

The 3GPP IMS core 530 authenticates an IMS user, and stores a user profile including a user registration state and session preference of a user. The 3GPP IMS core 530 may include a Proxy-Call State Control Function (P-CSCF) 531, an Interrogating (I)-CSCF 532, and a Serving (S)-CSCF 533.

A CSCF is a function of undertaking a portion related to a call and session processing, and includes an incoming call gateway function, a call control function, a serving profile database function, an address handling function, and the like.

The P-CSCF 531 is a first meeting point where the mobile terminal 510 accesses an IMS using a General Packet Radio Service (GPRS) access, transmits an SIP registration request message having received from the mobile terminal 510 to the I-CSCF 532, and manages an address of the S-CSCF 533 acquired while processing an SIP registration request of the I-CSCF 532.

The I-CSCF 532 is a first point of accessing a home network of the mobile terminal 510, inquires about a Home Subscriber Server (HSS), determines the S-CSCF 533, and allocates the S-CSCF 533 to the mobile terminal 510 during a registration process.

The S-CSCF 533 is a subsystem for managing a session state of the mobile terminal 510 and performing a control service, registers a subscriber in the HSS, downloads subscriber information, and stores a service profile.

The MIIS 540 is defined in IEEE 802.21, and provides the MIHF 523 with handover information.

Transceiving of a MIH message between the mobile terminal 510 and the network device 520 is performed between the MIHF 513 and the MIHF 523. In this process, an exemplary embodiment introduces a concept of the SIP event/presence service client 511, the SIP event/presence service server 521, and the MIH-SIP SAPs 512 and 522.

The handover information in an MIH is processed by the MIHFs 513 and 523, and the handover information processed by the mobile terminal 510 is transmitted to a lower layer using a 3GPP/3GPP2 interface, an IEEE 802 interface, and the like. Information processed by the MIHF 513 of the mobile terminal 510 and the MIHF 523 of the network device 520 may not be directly transceived with a counterpart MIHF. Accordingly, each of the MIHFs 513 and 523 is connected with the SIP event/presence service client 511 and the SIP event/presence service server 521, respectively, using the MIH-SIP SAPs 512 and 522 in order to transceive the handover information, and the handover information is transceived by an SIP between the SIP event/presence service client 511 and the SIP event/presence service server 521.

According to an exemplary embodiment described above, handover information may be exchanged using an SIP, the SIP being a legacy application layer protocol.

FIG. 6 illustrates a flow of handover information based on an SIP presence service between a mobile terminal 610 and an IMS mobility service application server 620 according to an exemplary embodiment.

In operation S641, an MIHF 611 of the mobile terminal 610 transmits current network information to a presence service client 612, and the presence service client 612 transmits an SIP PUBLISH request including the current network information to a presence service server 621 of the IMS mobility service application server 620, and registers the SIP PUBLISH request in an IMS. An MIHF 622 receives the current network information.

In operation S642, the MIHF 622 requests a parameter of a network located near the mobile terminal 610 for an MIIS 630, and the MIIS 630 finds the parameter based on a request, and transmits the parameter to the MIHF 622.

In operation S643, the MIHF 622 transmits an MIH_Scan.Request to search for a network existing near the mobile terminal 610 to the presence service server 621. The presence service server 621 transmits an SIP NOTIFY request including the MIH_Scan.Request to the presence service client 612. The MIHF 611 receives the MIH_Scan.Request from the presence service client 612.

In operation S644, the MIHF 611 transmits an MIH_Scan.Response including surrounding network information in response to the MIH_Scan.Request to the presence service client 612. The presence service client 612 transmits the SIP PUBLISH request including the MIH_Scan.Response to the presence service server 621. The MIHF 622 receives the MIH_Scan.Response from the presence service server 621.

In operation S645, the MIHF 622 requests the parameter of the network located near the mobile terminal 610 to the MIIS 630, and the MIIS 630 finds the parameter based on the request and transmits the parameter to the MIHF 622.

In operation S646, the MIHF 622 compares the network information included in the MIH_Scan.Response and the parameter of the network transmitted from the MIIS 630, and selects a network that may be connected with the mobile terminal 610. The MIHF 622 transmits an MIH_Handover_Commit.Request to report the selected network information and execute a handover to the presence service server 621. The MIH_Handover_Commit.Request is included in the SIP NOTIFY request, and is transmitted through the presence service client 612 to the MIHF 611.

In operation S647, the MIHF 611 transmits an MIH_Handover_Commit.Response in response to the MIH_Handover_Commit.Request to the presence service client 612, and the MIH_Handover_Commit.Response is included in the SIP PUBLISH request and is transmitted to the MIHF 622 through the presence service server 621.

Where a link layer of the mobile terminal 610 is linked up, the MIHF 611 transmits MIH_Link_Up to the MIHF 622 in a form of the SIP PUBLISH request in operation S648, and where a handover process is completed, the MIHF 611 transmits, to the MIHF 622, MIH_Handover_Complete that reports handover completion in the form of the SIP PUBLISH request.

According to an exemplary embodiment described above, MIH information may be transceived using an SIP, the SIP being a legacy application layer protocol.

According to certain embodiments described above, a message including handover information may be transceived using an application layer protocol, for example, a legacy application layer protocol. Accordingly, handover information may be transceived without modifying a data transmission-related mechanism of a lower layer in each network. Moreover, handover information may be transceived without generating a new protocol.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile terminal comprising:
a transmission unit configured to transmit a request message for handover information to a network device; and
a receiving unit configured to receive a response message including the handover information from the network device, wherein:
the request message and the response message are transceived by an application layer protocol,
the application layer protocol corresponds to a Session Initiation Protocol (SIP),
the transmission unit transmits the request message using an SIP SUBSCRIBE request or an SIP PUBLISH request,
the request message includes the handover information,
if the transmission unit transmits the request message using the SIP SUBSCRIBE request, the SIP provides an SIP event service,
if the transmission unit transmits the request message using the SIP PUBLISH request, the SIP provides an SIP presence service, and
the handover information includes at least one of a network type, an operator name, and a roaming agreement.

2. The mobile terminal of claim 1, wherein the transmission unit repeatedly transmits the request message, and the receiving unit receives the response message corresponding to each of the transmitted request messages.

3. The mobile terminal of claim 2, wherein the request message includes an expiration time value with respect to a time of receiving the response message, and the expiration time value corresponds to 0.

4. The mobile terminal of claim 1, wherein the transmission unit transmits the request message once, and the receiving unit repeatedly receives at least one response message corresponding to the transmitted request message.

5. The mobile terminal of claim 4, wherein the transmission unit transmits, to the network device, a stop message to stop receiving the response message.

6. The mobile terminal of claim 1, further comprising:
an interface unit configured to connect the receiving unit and the transmission unit with a device to perform a handover function.

7. The mobile terminal of claim 1, wherein a handover corresponds to a Media Independent Handover (MIH).

8. The mobile terminal of claim 1, wherein the application layer protocol corresponds to a mobility support protocol.

9. The mobile terminal of claim 1, wherein the receiving unit receives the response message using an SIP NOTIFY request.

10. The mobile terminal of claim 5, wherein the SIP provides the SIP presence service, and
the transmission unit transmits the stop message using the SIP SUBSCRIBE request.

11. The mobile terminal of claim 1, wherein the handover information is transceived by the application layer protocol without modifying a data link layer.

12. The mobile terminal of claim 1, wherein the transmission unit transmits, to the network device, a stop message in response to receiving the handover information, which is unnecessary for the mobile terminal.

13. A network device comprising:
a receiving unit configured to receive a request message for handover information from at least one mobile terminal; and
a transmission unit configured to transmit a response message including the handover information to the at least one mobile terminal, wherein:
the request message and the response message are transceived by an application layer protocol,
the application layer protocol does not provide the handover information to a data link layer,
the application layer protocol corresponds to a Session Initiation Protocol (SIP),
the request message corresponds to an SIP SUBSCRIBE request or an SIP PUBLISH request,
the request message includes the handover information,
if the request message corresponds to the SIP SUBSCRIBE request, the SIP provides an SIP event service,
if the request message corresponds to the SIP PUBLISH request, the SIP provides an SIP presence service, and
the handover information includes at least one of a network type, an operator name, and a roaming agreement.

14. The network device of claim 13, wherein the receiving unit repeatedly receives the request message, and the transmission unit transmits the response message corresponding to each of the received request messages.

15. The network device of claim 13, wherein the receiving unit receives the request message once, and the transmission unit repeatedly transmits at least one response message corresponding to the received request message.

16. The network device of claim 13, wherein, where the transmission unit receives a stop message to stop transmission of the response message, the transmission unit stops the transmission of the response message to the at least one mobile terminal.

17. The network device of claim 13, further comprising: an interface unit configured to connect the receiving unit and the transmission unit with a device to perform a handover function.

* * * * *